July 2, 1940.  R. H. LAWSON ET AL  2,206,097

KNITTING MACHINE AND METHOD

Filed April 18, 1936   9 Sheets-Sheet 1

INVENTORS:
ROBERT H. LAWSON,
ISAAC H. C. GREEN
By Roy F. Lovell
ATT'Y.

July 2, 1940. R. H. LAWSON ET AL 2,206,097
KNITTING MACHINE AND METHOD
Filed April 18, 1936   9 Sheets-Sheet INVENTORS:
ROBERT H. LAWSON,
ISAAC H. C. GREEN,
By Roy F. Lovell,
ATT'Y.

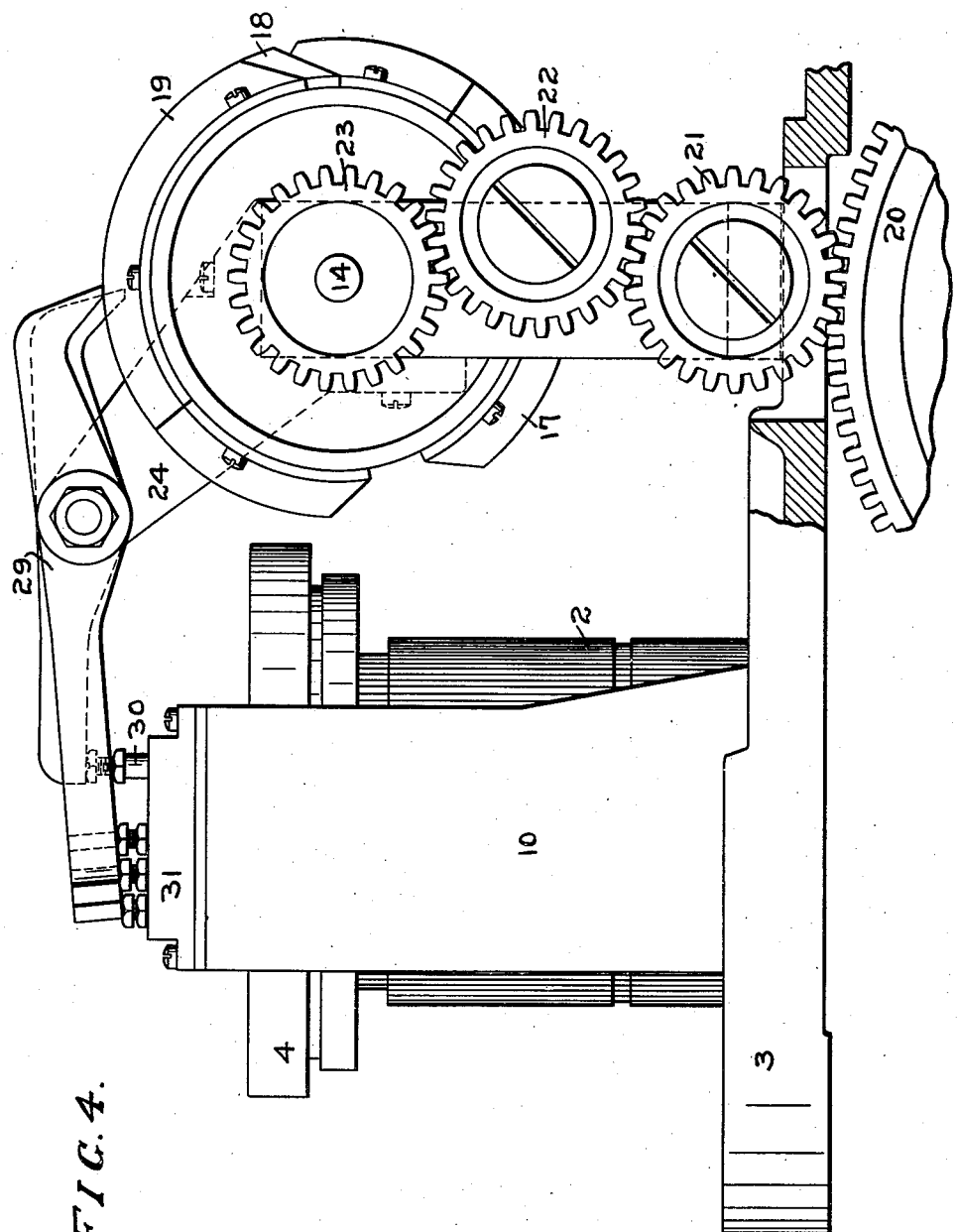

July 2, 1940.    R. H. LAWSON ET AL    2,206,097
KNITTING MACHINE AND METHOD
Filed April 18, 1936    9 Sheets-Sheet 5
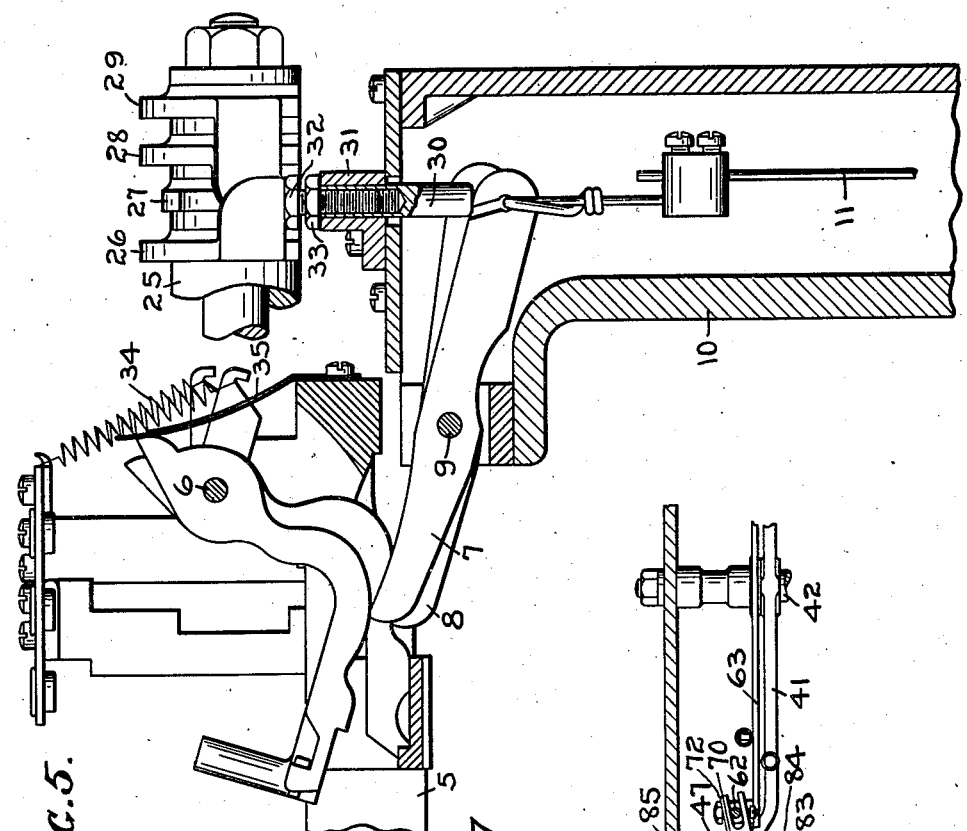
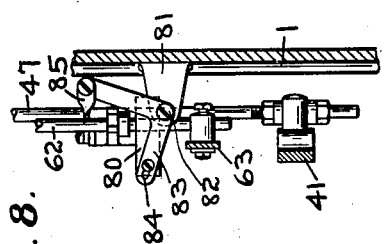
INVENTORS:
ROBERT H. LAWSON,
ISAAC H. C. GREEN,
By Roy F. Lovell,
ATT'Y.

July 2, 1940.  R. H. LAWSON ET AL  2,206,097
KNITTING MACHINE AND METHOD
Filed April 18, 1936   9 Sheets-Sheet 6

INVENTORS:
ROBERT H. LAWSON,
ISAAC H. C. GREEN,
By Roy F. Lovell
ATT'Y.

July 2, 1940.　　R. H. LAWSON ET AL　　2,206,097
KNITTING MACHINE AND METHOD
Filed April 18, 1936　　9 Sheets-Sheet 7

INVENTORS:
ROBERT H. LAWSON,
ISAAC H. C. GREEN,
BY Roy F. Lovell,
ATT'Y.

July 2, 1940.  R. H. LAWSON ET AL  2,206,097
KNITTING MACHINE AND METHOD
Filed April 18, 1936   9 Sheets-Sheet 8
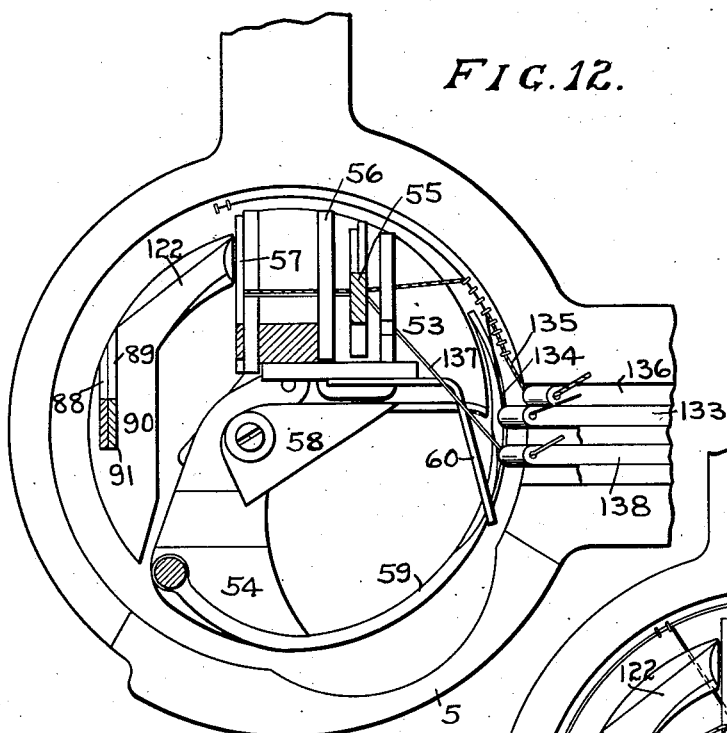
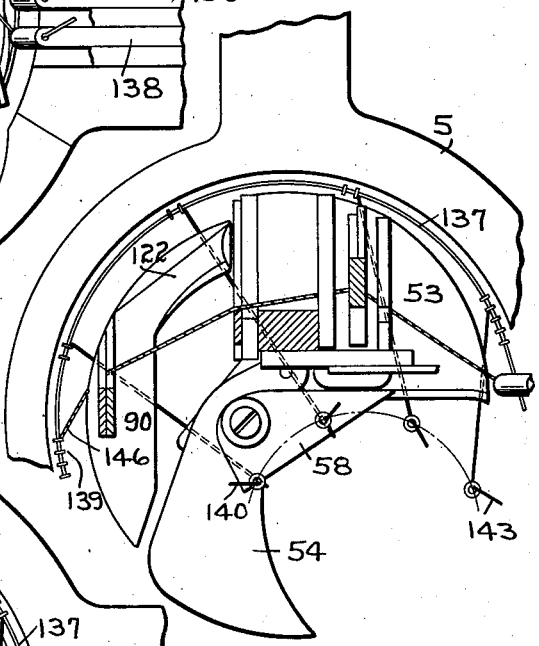
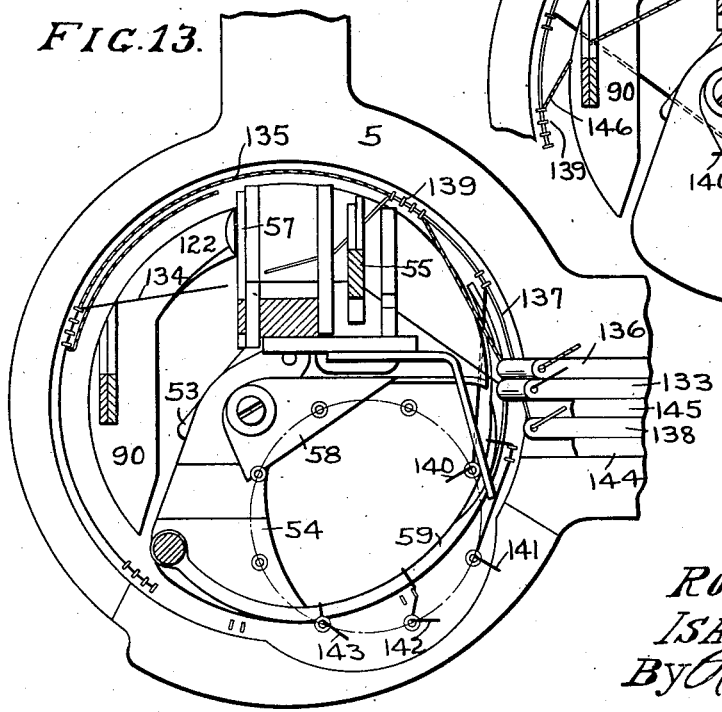
INVENTORS:
ROBERT H. LAWSON,
ISAAC H. C. GREEN,
By Roy F. Lovell
ATT'Y.

July 2, 1940.  R. H. LAWSON ET AL  2,206,097
KNITTING MACHINE AND METHOD
Filed April 18, 1936   9 Sheets-Sheet 9
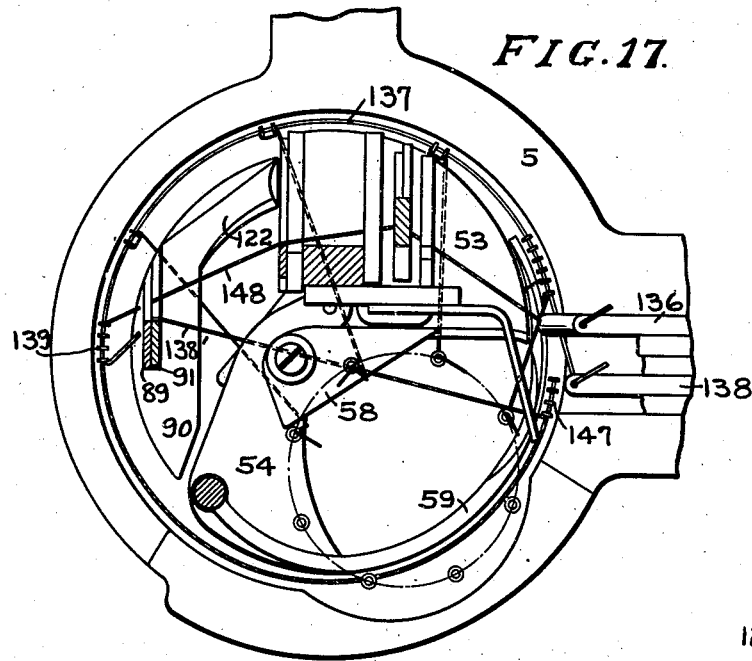
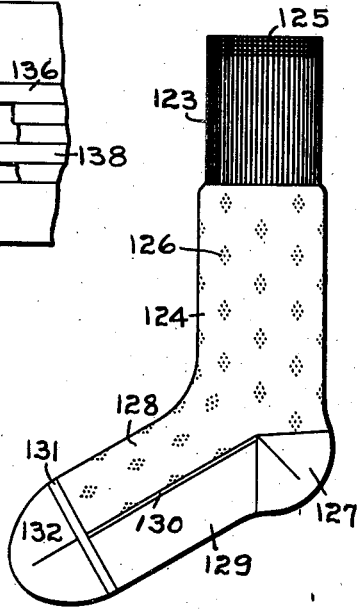
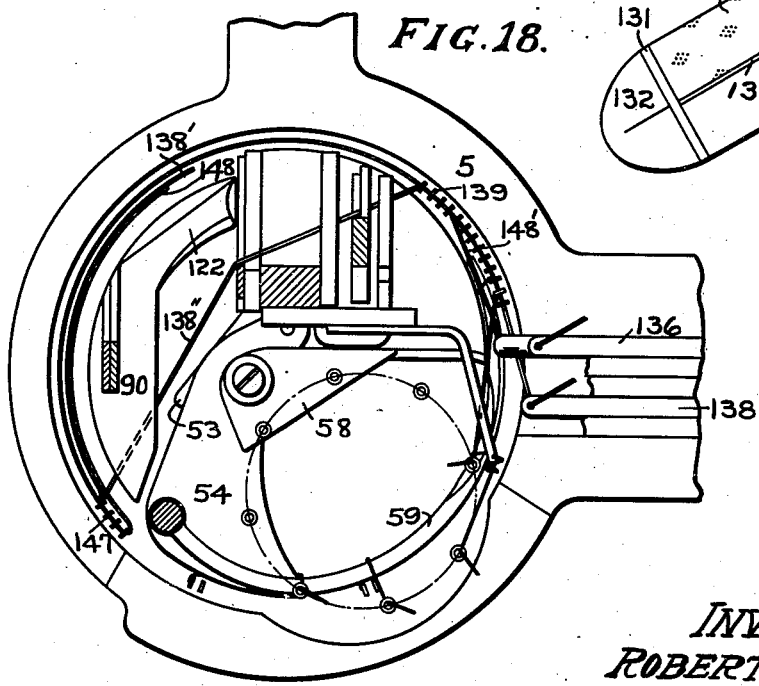
INVENTORS:
ROBERT H. LAWSON,
ISAAC H. C. GREEN,
By Roy F. Lovell
ATT'Y.

Patented July 2, 1940

2,206,097

UNITED STATES PATENT OFFICE 2,206,097

KNITTING MACHINE AND METHOD

Robert H. Lawson, Pawtucket, and Isaac H. C. Green, Central Falls, R. I., assignors to Hemphill Company, Central Falls, R. I., a corporation of Massachusetts Application April 18, 1936, Serial No. 75,212

18 Claims. (Cl. 66—135)

This invention deals with a method and machine for knitting a stocking having a so-called split-foot of the circular type as contrasted to the true split-foot reciprocatorily knit and in which stocking wrap striping is employed for ornamenting both the leg and foot. Wherever the term split-foot is hereinafter used, it is to be understood as designating that type of stocking or a machine for knitting the same as above indicated. Preferably the stocking will be knitted with a plain sole, that is, the wrap pattern will appear only in the instep while the sole knitted of a different yarn may be of another color or of different characteristics from the yarn employed throughout the leg and instep but will not be characterized by any pattern being knitted therein. The article thus produced is novel since, so far as we are able to ascertain, stockings with a split-foot have never been ornamented by wrap striping although other types of ornamentation have been employed.

In the drawings:

Fig. 4 is an illustration, partly in section, showing a detail of the drive for the yarn changing drum;

Fig. 5 is a section showing the manner in which yarn guides are controlled by the yarn changing drum;

Fig. 7 is a detail of the special control for the binder and cutters;

Fig. 8 is a detail of the mechanism employed to shift the timing of the cutter;

Figs. 12-18 show consecutive steps in the knitting of a split-foot wherein a wrap pattern is being produced;

Fig. 19 shows a stocking knitted in accordance with the invention.

Figure 1:
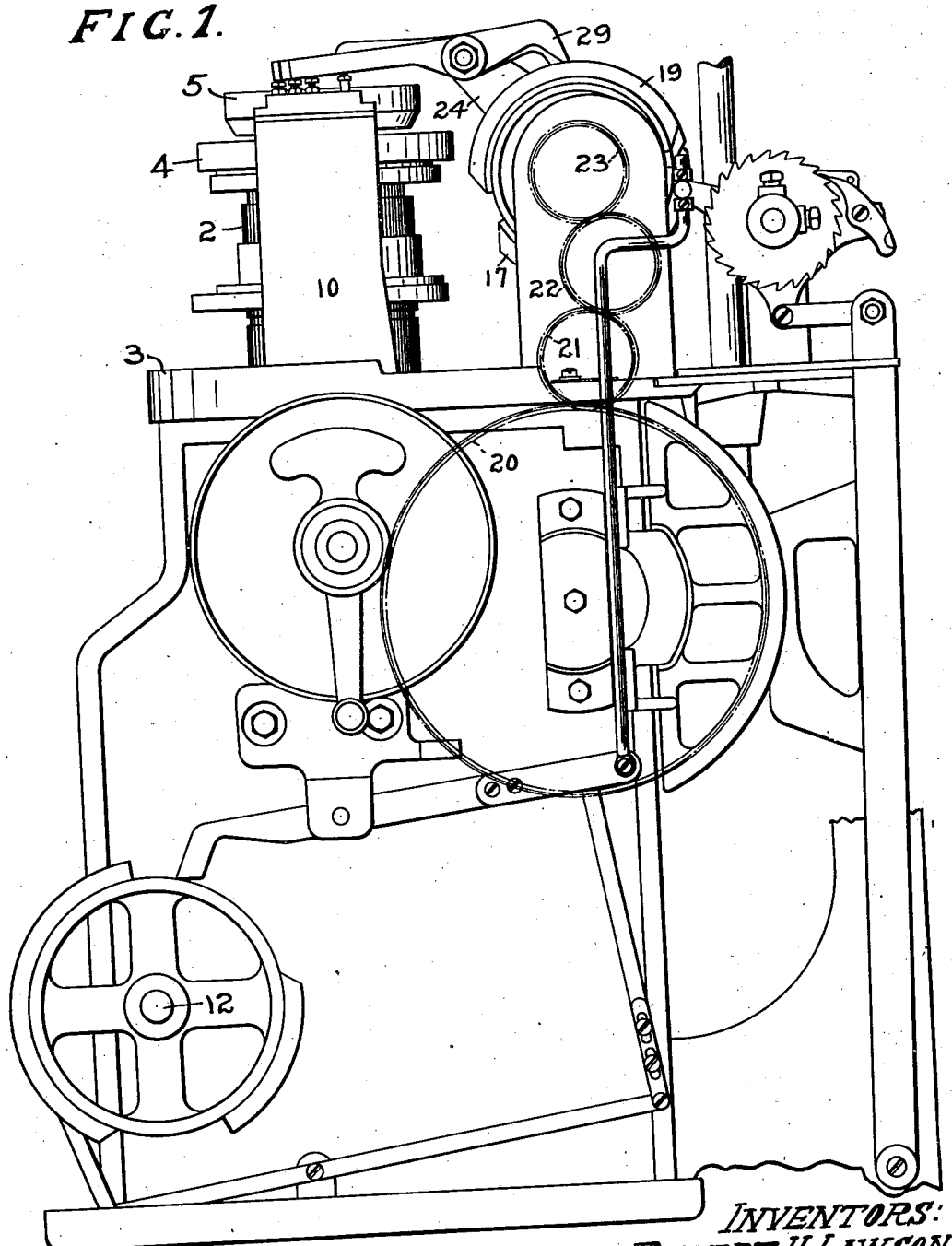
Fig. 1 is an elevation showing one side of the machine and part of the mechanism controlling the feeding of yarns.

Stockings of a type having a split-foot have certain advantages which make them popular in some markets but these stockings have usually been of a plain pattern or else have been ornamented by means other than ornamentation with wrap yarns. Obviously it is desirable to wrap the same pattern which is used throughout the leg of a stocking down into the instep in case a plain sole is to be made, or else throughout the entire foot. Due to the particular construction and method of making a split-foot it has not been practicable to use any of the existing wrapping machines for making such a stocking for various reasons. Chiefly of importance among these reasons is the necessity of manipulating wrap yarns and wrap floats and the floats of the instep and sole yarns which are knitted within the foot of the stocking. These floats might not be cut at all until after the stocking was completed and dropped from the machine when knitting a plain foot but in the event wrapping is to be done in any part of the foot, it is evident that these floats should be cut to prevent their becoming entangled with the wrap floats. Even though said floats were cut in the ordinary cutter and binder one of the floats would be cut at one side of the stocking while the next float would be cut at the opposite side of the stocking with the result that a series of long floats would hang from either side of the stocking thus being very likely to become entangled and making it practically impossible to knit any such stocking with a wrap pattern in the foot portion. The floats of the instep and sole yarns are cut in such a manner that they trail around on the sole side of the stocking and do not tend to wrap on some of the needles with the wrap yarns, a situation which might be very likely to happen if one float were cut at one side and the other float at the other side of the knitted tube.

The method and mechanism herein employed cuts all floats at one side of the stocking so that that side of the stocking will have a series of closely trimmed floats projecting therefrom which could not have any effect on the knitting of the wrap yarns, and the opposite side of the stocking will have a series of longer floats which, since they all trail from the same side of the stocking, will be more easily handled and kept from entangling with any other yarns, either knitting or wrapping. When such a stocking has been produced it is the full equivalent in every respect of any other split-foot stocking and it will only be necessary to cut the long floats at one side of the stocking to complete the same. The pattern which characterizes the leg will appear down into the instep without being broken at the junction between leg and instep.

In its broad aspects the invention consists of means for controlling yarns to knit the two halves of the foot with a proper overlap of three of four needles on either side and may have another guide control for the purpose of horizontal striping in the event a stocking is to be ornamented in that way as well as by wrapping. The usual clamp and cutter will be employed for binding and cutting yarns throughout the usual yarn changes in the stocking, but an auxiliary cutter of unusual construction having a plate for guiding floats into the cutter or passing them by so that they may be cut on the next half revolution will be employed throughout the knitting of the foot only. This special cutter is located very close to the circle of needles and thus cuts its yarn very short on one side of the stocking. After starting knitting in the foot it becomes necessary to cut all the yarns floating, and as before stated, to cut them at the same side of the stocking. This means that one float must be cut adjacent the last needle upon which its yarn was knitted and that the other float is to be cut adjacent the first needle upon which its yarn was knitted but after it had once passed under the plate on the special cutter. The actual mechanism for accomplishing these purposes and the manner in which it is employed to control the knitting of a stocking as described will be more fully given in the following disclosure.

The wrapping mechanism employed in the case is of the same type as illustrated in Hemphill Patent 1,702,608, but any conventional wrapping mechanism may be employed depending upon the nature of the machine and the type of wrapping pattern which it is desired to produce. The wrapping of the ornamental yarns would necessarily be governed by some selective mechanism preferably the selection of needles similar to that in the patent above mentioned, further, the wrapping means would be provided for removal to an inactive position during knitting of parts which were not to be ornamented; there would also be provision throughout the knitting of the foot for selecting needles upon which the pattern will occur only in the instep. This wrapping mechanism, the control during knitting the heel and toe, and the provision for making a plain sole have all been disclosed in the prior Hemphill patent and since they form no particular part of the present invention will not be described in detail in this case.

Referring to Figs. 1–11 we will now describe the mechanism which functions to produce the new stocking herein described. The machine has a frame 1, a series of independent needles in a cylinder 2, a so-called circular base 3, sinker assembly indicated at 4 and a latch ring 5. The needles are preferably of the latch type and the cylinder rotates relatively to a set of cams which comprise the usual knitting cams for such machines. It is obvious that the cams might rotate relatively to the cylinder which would be fixed within the circular base of the machine and that other than latch needles might be used.

A series of yarn feeding fingers or guides, herein shown as five in number are pivoted at 6 on an extension of the latch ring and are controlled by a series of levers 7, 8, etc., pivoted at 9 at the upper end of the usual yarn change lever bracket 10 extending upwardly from the circular base. Each of these levers is controlled by an adjustable wire 11 which projects downwardly to attach to another series of levers which are controlled from the usual drum (not shown) on main cam shaft 12. These levers function under the influence of cams on said drum to bring about all the yarn changes which are necessary to the knitting of a stocking, but do not control those levers feeding yarns to the instep and sole throughout the making of a split-foot while that part of the stocking is being knitted. For that particular purpose we have provided a novel system of control for the levers which control functions independently of the control from the main cam shaft and which is not influenced by that control since it is rendered inoperative throughout the knitting of other portions of the stocking than the foot.

Referring to Figs. 1, 2, 4, 5 and 6, a U-shaped bracket 13 has been extended upwardly at the rear of the machine to support a shaft 14 within bearings in said bracket. Said shaft has a drum 15 mounted thereon which carries a series of cams 16, 17, 18 and 19 attached thereto as illustrated for controlling four of the yarn fingers in a manner later to be described. Shaft 14 is driven from 104-gear 20, two idler gears 21 and 22 and a pinion 23 fixed to the outer end of the shaft. These gears are constantly in mesh and thus the shaft and drum are continuously rotated although by a separate control it is possible to shift the shaft and drum to the left, Fig. 6, so that none of the cams 16—19 will contact yarn fingers and thus the function of this mechanism will be rendered ineffective. The ratio of gears 21—23 is such that shaft 14 is driven at four times the speed of gear 20 or at the same speed as the needle cylinder.

Figure 2:
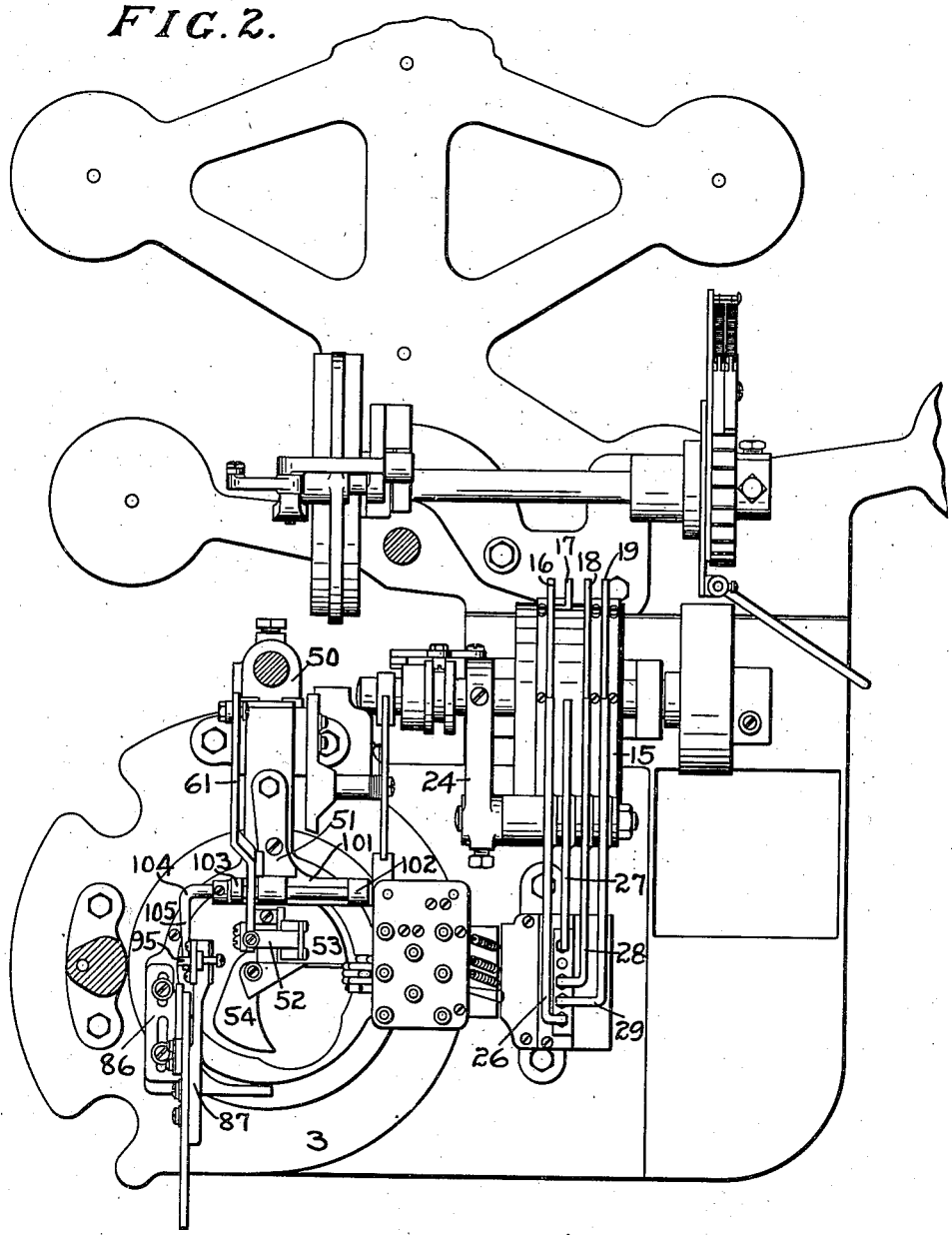
Fig. 2 is a plan of the same machine illustrating the control for yarn guides and the controls for the yarn binder and cutters.

A bracket arm 24 is attached to one arm of the U-shaped bracket 13 and carries a pivotal support 25 for a series of levers 26, 27, 28 and 29, lever 27 being straight from end to end while levers 26, 28 and 29 are bent at right angles at one end and are also of different length as illustrated in Fig. 2, for the purpose of engaging with a series of tappets 30, each of which engages with one of the levers 7, 8, etc. Whenever one of the cams 16—19 strikes the toe portion of one of the levers 26—29 it will depress the tappet 30 which is individual to that particular lever thus lifting the corresponding yarn fingers or guide from a feeding position. Each of the tappets 30 is guided within an opening in an extension 31 attached to the top of bracket 10. Each tappet 30 comprises a cylindrical portion within which is threaded an adjusting screw 32 maintained in position by a lock nut 33. The yarn guides which pivot at 6 are normally maintained in a feeding position by means of springs 34 or by springs 35, some of the fingers having one type of spring and some having the other.

Since drum 15 is rotated at the same speed as the needle cylinder it will be evident that the cams 16—19 will cause the yarn feeding fingers to move from feeding position for a space equivalent to that portion of the circumference of drum 15 circumscribed by one of the cams. During the remainder of the revolution said finger will remain in active position. It will be noted that the cams do not extend over a complete semi-circumference of the drum since yarn guides must be in active position for more than a half revolution of the needle cylinder so as to produce a satisfactory overlapping of the instep and sole yarns at each side of the stocking. In this particular case we have illustrated an overlap of four needles although it is probably satisfactory to overlap more or less than four needles with both yarns depending upon the article produced, type of yarn, etc.

Figure 3:
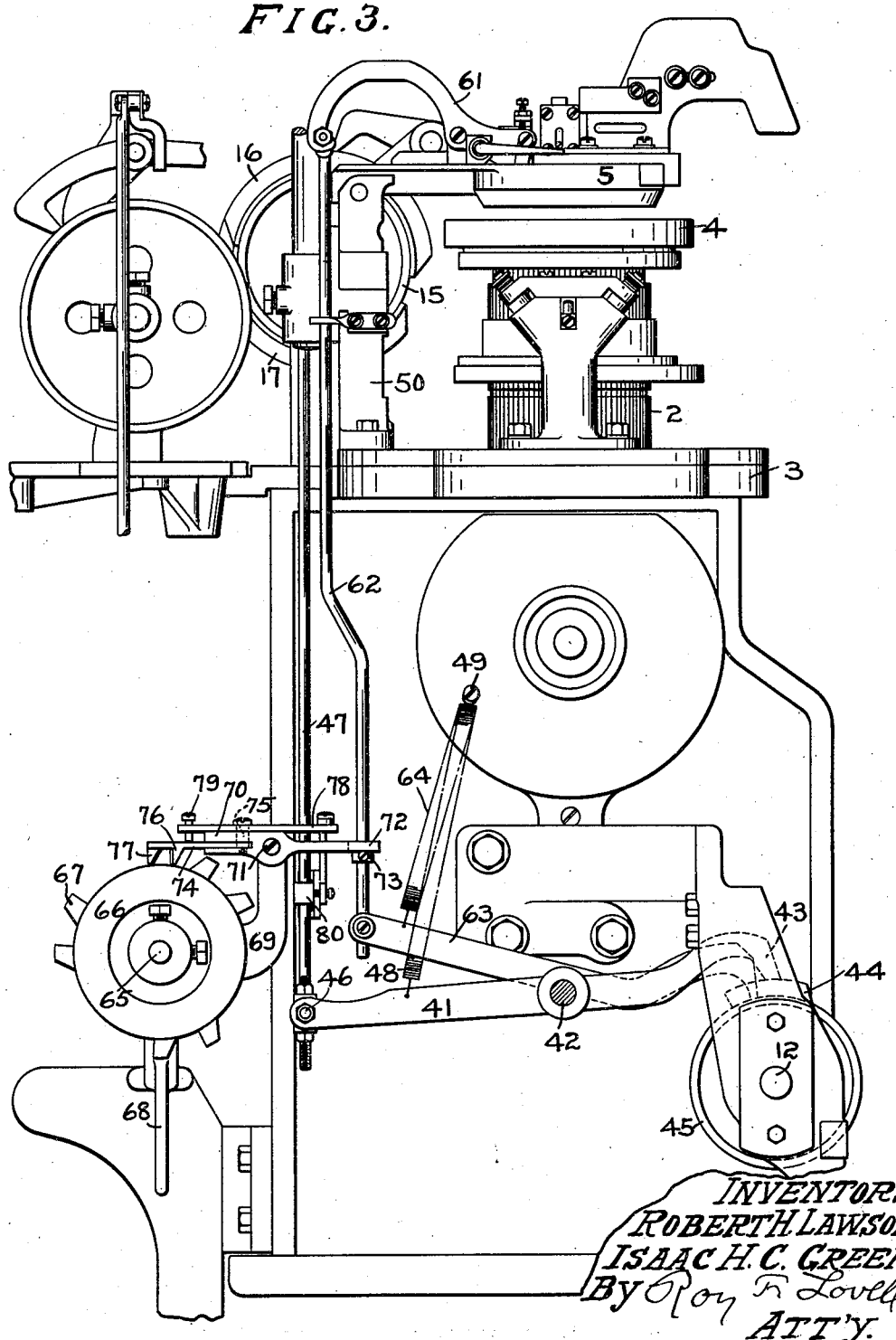
Fig. 3 is an elevation showing the machine as seen from the opposite side to that illustrated in Fig. 1 and showing in some detail the mechanism for controlling the binder and cutters from the main cam shaft and from a special shaft employed to control the cutters throughout knitting of the foot.
Figure 6:
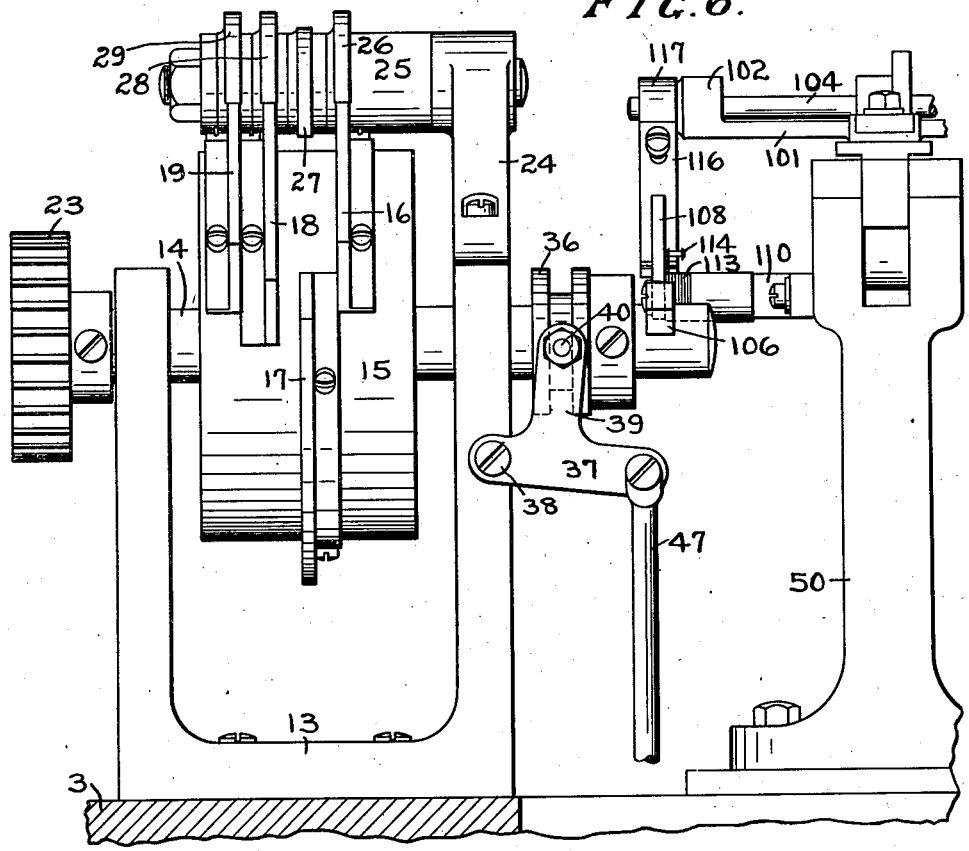
Fig. 6 illustrates this drum as seen from the back of the machine and also shows the control for moving the same to and from active position.

Referring to Figs. 2, 3, and 6, shaft 14 is provided at the inner end with a grooved collar 36 adjustably fixed to the shaft by means of a set screw or some other satisfactory means. A lever 37 is pivoted to bracket 13 at 38 and has an angularly projecting arm 39 which carries a pin 40 which projects within the groove in collar 36. A lever 41 pivoted at 42, Figs. 3, 7 and 8, has a toe portion 43 which engages a cam 44 on drum 45 secured to the main cam shaft. This lever 41 has connected at 46 a rod 47 which attaches at its upper end to the free end of lever 37. A spring 48 is attached to lever 41 and to a pin 49 fixed to the machine so that the toe of lever 41 is always maintained in contact with the drum or with cam 44 thereon. When said toe 43 does ride on the cam 44 the shaft 14 will be moved to the position illustrated in Fig. 6 whereupon control of yarn guides will be influenced by cams 16—19 as well as by the main cam drum control if the same should function while drum 15 is in an active position. This cam 44 moves shaft 14 and the attached parts as illustrated when it is necessary to specially control yarn guides at the knitting of the sole and instep of the split-foot. At other times this drum will be moved to inactive position in which position collar 36 will butt against bracket 13. In this position gear 23 will still mesh with idler 22 so that the parts will be driven but will not have any active effect on the functions of the machine.

Now referring to Figs. 2, 3, 6, 7, 8, 9, 10 and 11, we will describe the main yarn binder and cutter, the auxiliary cutter and the mechanism for controlling both. The latch ring 5 is hinged at the upper end of a latch ring post 50 and carries a bracket 51 fixed thereon which extends within the needle circle of the machine and carries a conventional binder and cutter generally indicated at 52, Fig. 2, which is of the usual Banner construction, or may be of any other suitable type such as would be used in this sort of machine. This binder carries a plate 53 to which has been attached an extension 54, better shown in Fig. 12 where the parts are shown in their normal size. This plate 53 serves to support the usual clamp or binder 55, a secondary binder 56 and a cutter 57. In Fig. 12 two yarns are shown being bound by three clamps and having been cut by the cutter 57. The purpose of extension 54 and of another yarn controlling element 58 is to restrict the opening inside the needle circle within which floats of wrap yarn are to be restrained. A curved guiding members 59 is also attached to extension 54 and serves to further restrain these wrap floats and to control the wrapping yarns as they are taken by selected needles in a manner similar to that disclosed in Patent 1,702,608. Another hook-like member 60 serves to guide the wrap yarns under the plate and to restrain them.

This main binder and cutter is controlled by means of the usual lever 61 hinged to a part of bracket 51 and moved by means of a link 62 which is in turn attached to one end of lever 63 pivoted at 42 and having its opposite end in contact with drum 45 or with cams thereon for controlling the normal functions of this main binder throughout the knitting of a stocking. These cams have not been shown in this case for purposes of simplifying the illustration. A spring 64 is also attached to pin 49 and to the lever 63 to maintain the binder and cutter in open position except at such times as a cam on drum 45 closes the same.

During the knitting of the so-called split-foot it becomes necessary to control this binder by a means which is capable of operating more frequently than the control from the main cam shaft. For this purpose the striper shaft 65 has been provided with a drum 66 upon which have been arranged a series of cams one of which is indicated at 67. These cams 67 will be arranged according to requirements for operating the binder and according to the relative speed of shaft 65 which is driven in timed relation to other parts of the machine. Shaft 65 is mounted for rotation in the usual striper bracket 68 and this bracket has been extended at 69 to mount a lever 70 so that it may pivot at 71. This lever 70 has a forked end 72 which engages above a collar 73 on the link 62. The lever is provided with an extending part 74 which pivots at 75 and which has two projections or followers 76 and 77 arranged in different planes transversely of the lever so that as it is swung from one side to the other either follower 76 or follower 77 will be in a position to be affected by the cams 67. Followers 76 and 77 are also separated along the length of the lever so that 77 if in position to be contacted by cams will not be struck by a cam until a latter period than follower 76 would. This results in a movement of rod 62 and the binder at a later period than if follower 76 is to be engaged by cams 67. Another two armed lever 78 is also pivoted at 75 and engages a pin or extension 79 projecting upwardly from the swiveling extension 74 so that movements of lever 78 from side to side result in engaging one or the other of the followers with the cams.

Now referring to Figs. 3, 7 and 8, this lever 78 will be caused to select whichever of the followers is to be engaged by said cams 67 by a movement of rod 47 controlled by cam drum 44 on the main cam drum. Rod 47 is provided with a lateral extension 80 capable of being adjusted along the length of the rod in a desired manner. The frame carries a bracket 81 upon which pivots at 82 a bell crank lever 83 slotted at one end to engage a pin or other projection 84 on the lateral extension 80 so that movements of the rod will be imparted to the bell crank lever. A short link 85 is attached to lever 78 and also to the opposite arm of the bell crank lever 83 to convey its movement to the swiveling portion 74 of lever 70. When lever 41 is affected by cam 44 as illustrated in Fig. 3, follower 76 will be in a plane to be controlled by cams 67 and vice versa. The purpose of changing the relative timing of the action of the binder and cutter will be described with reference to the operation of the mechanism in knitting a stocking.

The auxiliary cutter which is used throughout the knitting of the instep and plain or other sole is located as shown in Figs. 2, 12, etc., at the side of the machine almost directly opposite the mouthpiece and very close to the needle cylinder so that it will cut its floats as short as possible. This cutter is attached to a bracket 86 which is in turn adjustably fixed by screws passing through slots therein and threaded into the top of the latch ring. The cutter itself is carried by the inner end of an arm 87 which is also attached to bracket 86 and consists of a fixed blade 88 which is welded or otherwise attached to the arm 87 and a movable cutter blade 89 which is formed in extension of a plate 90. Blade 89 cooperates with blade 88 to cut the float yarns at the proper time. A stem 91 extends from the blade and plate up through a channel in the end of arm 87 and within which the said stem may be moved vertically. At the upper end of the stem a projecting pin 92 has attached thereto a spring 93, the other end of the spring being fixed to a screw 94 threaded into the end of arm 87. This spring normally maintains the movable elements of this cutter in the position illustrated in full lines, Figs. 10 and 11. A pin 95 is threaded into the stem 91 and also projects outwardly through a slot 96 in fixed blade 88 and in plate 97. The downward movement of the cutter blade 89 and plate 90 is limited by the lower extent of the slot 96; the cutter and plate will be moved upwardly by means presently to be described, throughout an extent sufficient to cut the float yarns and to place the plate 90 in the dotted line position, Fig. 11, for dividing or passing one of the float yarns beneath the cutter so that it will not be engaged at the particular time for reasons which will be apparent from the description of the operation of this device. The two cutter blades are maintained in contact so as to have a suitable shearing action by means of springs 98 between the heads of screws 99 and the plate 97 as illustrated.

Figure 9:
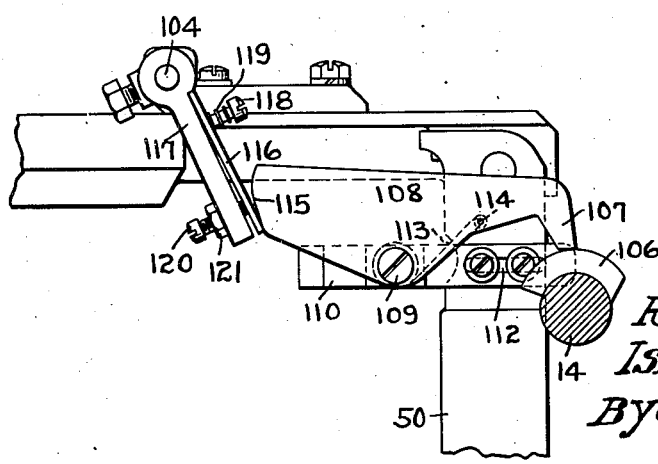
Fig. 9 is a detail view of certain parts of the mechanism employed to operate one of the cutters.

Now referring to Figs. 2, 6 and 9, the mechanism which operates this auxiliary cutter will be described. Bracket 51 is extended at 101 to provide bearings 102 and 103 within which a spindle 104 is carried and is free to turn. This spindle 104 is bent at an angle as shown at 105 and projects under the pin or projection 95 by means of which the cutter and plate are lifted upwardly as the spindle is moved through a slight angle. The shaft 14 which carries the drum 15 the purpose of which has been described, also has attached thereto at its inner end a cam 106 which engages the toe 107 of a rocking lever 108. The lever 108 is pivoted at 109 on an extension 110 adjustably attached to the latch ring post 50 by means of screws or other attaching means projecting through slot 112 in the bracket as shown. A spring 113 has several coils passing about the support or pivot 109 for the lever and an extending portion which engages a projection 114 on the lever. This spring always maintains the toe 107 in contact with the cam or with the surface of the shaft. The other end of this lever has been bevelled as shown at 115 and engages an adjustable plate 116 on arm 117 fixed to the end of spindle 104. This plate 116 is maintained as a part of arm 117 by screw 118 and spring 119 but the lower end of the plate which is contacted by the bevelled end of the arm 108 may be adjusted by screw 120 and this adjustment maintained by lock nut 121. The mechanism just described provides a very delicate adjustment for the cutter and plate controlled by the cam 106 and may be used to take up any wear in the parts after a period of continued use.

Figure 10:
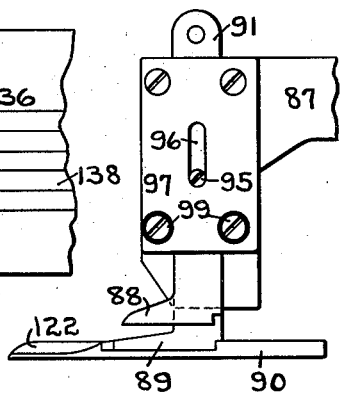
Figs. 10 and 11 are detail views showing the special cutter and plate for guiding floating yarns.
Figure 11:
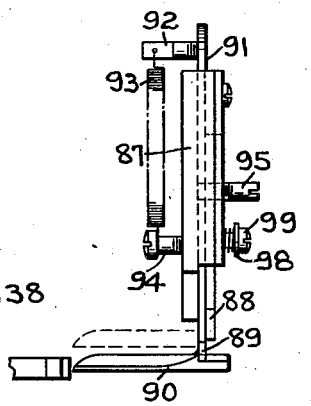

Since the shaft 14 makes one turn for every revolution of the needle cylinder, cam 106 will lift the cutter and plate once during each revolution thereof so that there will be one positive cutting movement per revolution. This upward movement of the cutter is started at an earlier period in the timing of the mechanism and is maintained for a longer period than would be necessary if cutting of the float threads was the only function anticipated. The plate 90 has a part 122 extending around at an arc as illustrated in Fig. 12, etc., the leading edge of which is rounded off as shown in Figs. 10 and 11. When the cutter and plate are in lower position as illustrated in Figs. 10 and 11 the bottom of the plate will be approximately on the same level as the bottom of the main binder plate 53 and extension 54. At such position floating yarns passing over the top of binder plate 53 will also pass over the top of curved extension 122 and will find their way between the cutter blades 88 and 89. In the operation of the machine the cutter will be moved upwardly to cut such a float which has been drawn over extension 122 and between the blades and will be maintained in uppermost position until the next float which it is not desired to cut has passed, or until approximately 180 degrees of revolution of the parts have been made. The cam 106 is long enough to maintain the cutter closed and the plate raised until the next float to be drawn has passed beneath the end of extension 122 so that it can not find its way into the cutter. The plate will thereafter be dropped so that the said float will pass beneath the end of the binder plate 53, extension 54, etc., and further to assure that the other end of this float which is the end to be cut will pass over the top of extension 122. The sequence of operations will be described more thoroughly with respect to the operation throughout the knitting of a stocking.

Referring to Figs. 1, 2 and 3, a portion of the device which controls a part of the wrapping mechanism has been shown. This pattern mechanism for the wrapping control will not be described in this case since it does not play any important part of the invention and has been described in Patent 1,702,608, above mentioned. Any other wrapping device might be used which would prove practicable with the machine illustrated, it being understood that the example herein given is merely used for purposes of illustrating some sort of wrapping device which would be essential in knitting the stocking of the case.

Operation

Now referring to Figs. 12–18, we will describe the operation of the mechanism with respect to making a stocking similar to that shown in Fig. 19. The machine may have a rib top 123 transferred to the needles and then will knit a leg 124 in continuation of the rib top. The rib top may have an elastic yarn 125 incorporated in a few courses at the upper end thereof, or the top of the stocking may be knitted plain with elastic knitted or inlaid to give a rib appearance. Wrap patterns in the form of small diamonds as illustrated at 126 have been made throughout the leg of the stocking, these wrap patterns being capable of variation in accordance with a large field of pattern selection all as is well known in the art.

By means of a conventional striper mechanism the leg of the stocking may be ornamented with horizontal stripes (not shown) in addition to the wrap pattern. In such case the main binder will be caused to function by means of cams on drum 66 working upon the toe 77 of the swiveling lever 70 which functions through rod 62 to control that binder. The position of toe 77 is controlled by means of lever 41 as previously explained and when that particular toe is aligned with the cams 67, the timing of the binder will be proper for cutting and binding the striping yarn in accordance with the general practice, this being understood to apply throughout the leg of the stocking only.

After making the leg of the stocking a narrowed and widened heel 127 will be knitted in the usual way after which the split-foot comprised of an instep 128 and a sole herein shown as and preferably a plain sole 129 having an overlap 130 at either side as is characteristic of this type of foot will be made. After knitting the so-called split-foot a ring toe 131 may be knitted and in addition thereto a narrowed and widened toe 132, the loopers rounds, etc.

It is the knitting of this portion of the stocking termed the split-foot wherein we have knitted a wrap pattern in the instep, although it is not to be understood that the wrap pattern is limited to the instep only, since it would be knitted in the sole, continuing from the same pattern in the leg. It is also quite possible through a system of yarn change within the foot to augment the wrap pattern by horizontal striping throughout the foot or a portion thereof.

Now referring to Fig. 12 we have illustrated the knitting in the last throw of the heel, lever 133 feeding a heel yarn 134 represented as a solid black yarn for purposes of distinction. On this last throw in the heel the sole yarn 135 fed from lever 136 is introduced to the needles and is illustrated after being taken by a few needles as it is about to be withdrawn from the main binder; this sole yarn has been represented as a sectional or cross-hatched yarn for purposes of identification. The leg yarn 137 is still illustrated in the binder, its yarn lever 138 being in non-feeding position. In Fig. 12 the heel yarn lever 133 is shown in retracted position since the last throw in the heel knits a heel course partly from the heel yarn and partly from the sole yarn there being a short overlap of four needles more or less between the two. Now going to Fig. 13 we have shown the same parts as were illustrated in Fig. 12 but have shown the heel yarn 134 having been taken within the main binder 55 and cut by the cutter 57. The sole yarn has been completely withdrawn from the binder and has been knitted throughout the remainder of this last throw of the heel which is to continue in the same direction in rotary knitting. The said sole yarn has been withdrawn by lever 136 and leg yarn 137 has been inserted by lever 138. The two yarns are taken by four needles indicated at 139, these needles knitting the overlap at 130 or at the opposite side of the stocking as the case may be. It is to be understood that more or less than four needles may be commonly fed with both yarns at the overlap depending upon the particular article produced, the material, etc.

It is to be understood that the wrapping which was discontinued throughout knitting of the heel is to be continued in the foot and as illustrated in Fig. 13, four wrap yarns 140, 141, 142 and 143 will be fed to certain selected needles throughout the instep in accordance with the usual wrapping on Banner machines and that other wrap yarns might be fed throughout the sole if desired. For purposes of simplifying the illustration and for clearness we have not shown the other wrap yarns used throughout the leg in the four eyelets at the opposite side of the wrapping disc, but of course, wrap yarns would be passing down through those eyelets not being introduced at the sole since no needles are to be selected. Further, the yarn guides 144 and 145 which would carry striping yarns in the event the wrap pattern is to be supplemented by a striping pattern, have been broken away and no striping yarns are illustrated since the addition of more yarns within these Figs. 12–18 would only serve to confuse. In the event horizontal striping was to be employed throughout the instep 128, either guide 144 or 145, or both of them, might be alternated to feed colored yarn of a different color from that fed by guide 138 by suitable cams on drum 15. These cams would control the fingers 144 and 145 to introduce their yarns in place of the yarn 137 in the instep throughout as many courses as was deemed necessary for the stripe. These yarns would be cut in exactly the same way yarn 137 is to be cut and thus an explanation of the knitting of yarn 137 is equally an explanation of knitting a substitute yarn in the event the stocking instep is to be striped.

After the heel yarn 134 is taken within the main binder and before the sole yarn is taken by the needles, cam 44, Fig. 3, will actuate lever 41 to shift drum 15 so that its cams will function upon the special control for the yarn levers and so that cam 106 will start to actuate the special cutter at the side of the machine, plate 90 and extension 122. The swiveling portion of lever 70 will be shifted so that toe 76 will now function upon the cam on drum 66. This assures that levers 136 and 138 will be controlled by cams 17 and 19 respectively and that binding and cutting will take place at the proper time with respect to knitting striping yarns at the overlap 130. Further, the plate 90 and extension 122 will be so controlled under the influence of cam 106 that the sole yarn and the instep yarn will both be cut at the same side of the knitted tube as will be explained.

This special control of the main binder and cutter would not be necessary if there was to be no horizontal striping throughout the foot of the stocking. The timing of the main binder is such that it allows the horizontal striping yarns to be changed at the usual point throughout knitting of the leg, however, when the split-foot is to be knitted, these striping yarns must be released and clamped at the overlaps 130. It is for this reason that a provision is made for shifting the timing of the main binder during knitting the foot.

Now referring to Fig. 14, the sole yarn 135 which was withdrawn from the needles at 139, Fig. 13, has floated across the plate 53, over the top of extension 122 which was in lower position as shown in full lines, Fig. 11, then upon raising of the plate 90 has been cut by the auxiliary cutter leaving a short float 146. At this time the instep or leg yarn 137 is being knitted upon one-half, more or less, of the needles and the wrap yarns 140, 143 are shown wrapping about certain needles in the instep group, these yarns floating under the plate 53 and also plate 90.

Figure 15:
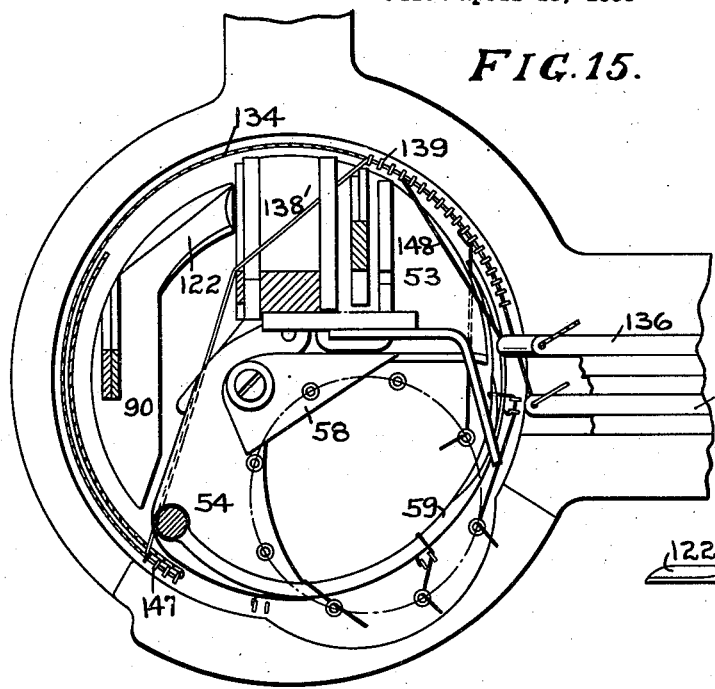

Now referring to Fig. 15 the wrap may be seen as being completed as soon as the wrap yarns pass off the end of hook 59, and further, the instep yarn 137 has been withdrawn at needles 147 and needles 139 are again taking that yarn. The sole yarn 135 has been knitted at the opposite half of the tube and is starting to float at 148. The float 138' of the instep yarn has passed over plate 53 not being affected by the main cutter and since plate 90 and extension 122 were raised as this float passed the leading edge thereof, it passed under this latter mentioned plate and was not cut by the auxiliary cutter.

Figure 16:
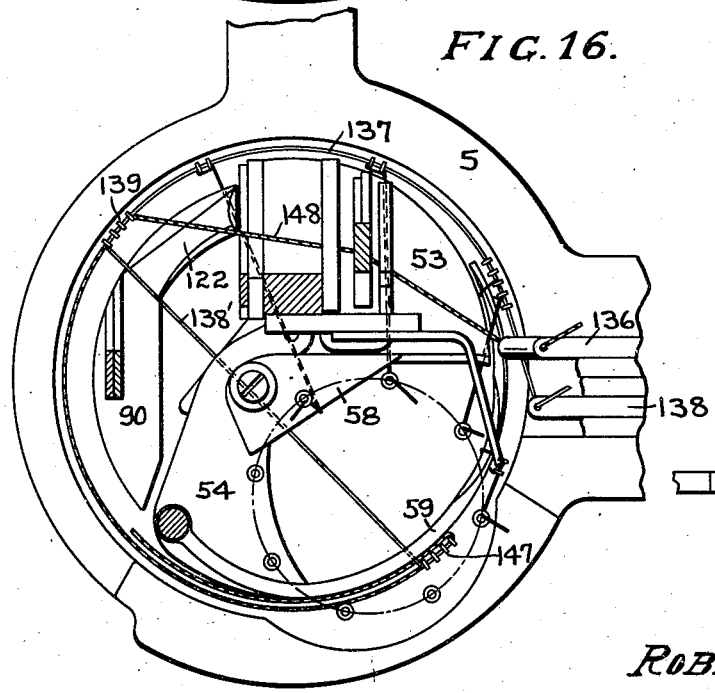

Referring to Fig. 16 the group of needles 139 are shown in a position slightly advanced from that shown in Fig. 15 wherein both floats 138' and 148 are being drawn over the top of extension 122 since that element is now in lower position, and will be carried within the cutter and cut as shown in the next Fig. 17. The instep yarn 137 is knitting at the time but the sole yarn 135 is about to be introduced to needles 147. Both yarns are thus cut at one side of the knitted fabric to leave very short ends. The other ends will be drawn back and will trail around behind the needles 147 as illustrated in Fig. 18. In that view another float 138" of the instep yarn 137 is shown passing under the plate 90, this float to be cut along with another float 148' when needles 139 get around in the vicinity of cutter 89. It can be seen that floats of the sole yarn always pass above plate 53 and above the extension 122. These floats can never become entangled in any way with the wrap yarns, and floats of the instep yarn which pass over plate 53 but under plate 90 are guided under the extension 54 since plate 90 is lowered just about the time that float is in the position shown in Fig. 18. As this float of the instep yarn is cut, Fig. 17, the floats of the wrap yarns are all extending outwardly to their respective needles or groups of needles and will not be interfered with by the trailing end of the float which will be pulled under the wrap yarns and will trail around with the long end of the other float as illustrated in Fig. 18. Of course, after the stocking has been completed these long floats will be cut out in any satisfactory manner to produce a finished article.

The invention has been described with respect to one particular example of the same and this disclosure is not to be limited thereby but is to be considered as only one illustrative embodiment of the invention. Many changes may occur to those skilled in the art without departing from the original concept. The invention is defined in the following claims:

1. A method of knitting a stocking with a split-foot having a wrap pattern knitted in the instep thereof, including the steps of knitting the sole and instep of the foot from two yarns, each yarn being knit throughout partial courses and floated over the remaining part of each course, wrapping pattern threads at preselected points in said instep and cutting the floats of the sole and instep yarns at each course and at one side of the fabric so that they will trail around at the sole part of the foot to avoid interference with the wrapping in the instep.

2. A method of knitting including the steps of forming courses from two separate yarns and overlapping said yarns at substantially opposite sides of the fabric, floating each yarn across the fabric where it is not knitted, cutting the floats thus formed at the same side of the fabric, and simultaneously knitting a wrap thread pattern on the fabric.

3. A method of knitting a circular tube of material including the steps of forming courses partly from one yarn and partly from another yarn and overlapping the two yarns at spaced points in the courses, floating each yarn throughout that portion of the circular tube of fabric wherein it is not knitted, wrapping pattern threads in the fabric and simultaneously cutting both floats thus formed closely adjacent one side of the fabric.

4. A method of knitting a circular tube of fabric including the steps of forming courses of two yarns each knitted throughout a part course and each overlapping the other for a short space throughout the courses but floating throughout the part of the courses in which they are not knitted, forming a pattern by wrapping pattern threads at certain predetermined points in the fabric and cutting the floats closely adjacent one side of the fabric so that they will not interfere with the pattern threads.

5. A method of knitting a split-foot in a stocking including the steps of forming consecutive courses from two yarns, overlapping the yarns at either side of the fabric for a short space in each course and floating each yarn across that part of the fabric in which it is not knitted, wrapping pattern threads throughout a portion of the fabric thus formed by introducing a series of wrap yarns to preselected needles and cutting the floats of the yarn first mentioned closely adjacent one side of the fabric so that they will not interfere with the wrap yarns.

6. In a knitting machine, means for knitting two yarns in alternate parts of each course of a tubular fabric and for overlapping the two yarns throughout a short space at either side of the same, thus floating the yarns across the parts of the fabric in which they are not knitted, and a cutter for cutting both floats at the same side of the fabric.

7. In a knitting machine, means for knitting consecutive courses of tubular fabric from two yarns, overlapping the yarns at substantially the opposite sides of each course and floating them across that part of courses in which they are not knitted, means for producing a wrap pattern on part of the fabric thus knitted and means for cutting the floats closely adjacent one side of the fabric and so that their ends lay around the opposite side of the fabric from that being wrapped whereby they do not interfere with the production of said wrap pattern.

8. In a knitting machine, means for knitting a circular stocking leg and in continuation thereof a foot comprised of courses the opposite portions of each of which are formed from separate yarns, overlapping the yarns at either side of the fabric thus formed and floating the said yarns across the fabric between said overlapping portions and means for knitting a wrap pattern on the fabric thus produced throughout the foot of said stocking, including means for cutting the floats of the yarns at and closely adjacent to one side of the fabric.

9. In a knitting machine, means for knitting consecutive courses of tubular fabric from two yarns, overlapping the yarns at substantially the opposite sides of each course and floating the yarns across that part of the courses in which they are not knitted, means for wrapping pattern threads in the fabric so produced and means for manipulating the floats so that they do not interfere with the pattern threads, including means for cutting the floats of the yarns at and closely adjacent to one side of the fabric.

10. In a knitting machine, means for knitting a tube of fabric having consecutive courses from two yarns, overlapping the yarns at substantially the opposite sides of the knitted tube and floating each yarn across that part of each course in which it is not knitted, means for wrapping pattern threads at preselected parts of the fabric thus produced and means including an auxiliary cutter and float yarn controlling member for cutting the floats at one side of the knitted tube close to the fabric.

11. In a knitting machine, means for knitting consecutive courses of tubular fabric, part of each course being knitted from one yarn and the other part being knitted from another yarn in such a manner that the two yarns overlap and float across the knitted tube when not being knitted thus producing two floats at each course, and means for cutting both floats at the same side of the knitted tube.

12. In a knitting machine, means for knitting consecutive courses of tubular fabric, part of each course being knitted from one yarn and the other part being knitted from another yarn in such a manner that the two yarns overlap and float across the knitted tube when not being knitted thus producing two floats at each course, means for cutting both floats at the same side of the knitted tube including a cutter positioned closely adjacent the said knitted tube and a guiding instrumentality for passing one of the floats by said cutter so that it will not be engaged thereby until the other end of said float enters the cutter at which time both floats will be cut.

13. In a knitting machine, means for knitting consecutive courses of tubular fabric from two yarns, overlapping the yarns at substantially the opposite sides of each course and floating them across that part of courses in which they are not knitted, means for wrapping pattern threads within certain predetermined areas of said fabric and means for cutting the floats of the first two yarns mentioned closely adjacent the knitted tube and at one side thereof including a cutter and a yarn controlling element associated therewith for first passing one of the floats by the cutter without cutting the same and thereafter for guiding both floating threads into the cutter for the purpose described.

14. In a knitting machine, means for clamping and cutting knitting yarns, an auxiliary pattern shaft having a series of cams thereon for controlling said clamping and cutting means and means for engaging said cams including a lever, an extension to said lever arranged to swivel relatively thereto and two followers on said extension either one of which may be engaged with said cams and means for shifting said followers to and from engagement with the cams to vary the timing of said clamping and cutting means.

15. In a knitting machine, the combination of a clamp and cutter and means for operating said clamp and cutter at predetermined timed intervals including an auxiliary pattern shaft, a drum and cams thereon, a lever for imparting movements to said clamp and cutter having means for contacting the cams on said drum and means functioning during the operation of said machine for varying the timing of said clamp and cutter including a swiveling extension to said lever, two followers for said cams one of which imparts movements to the clamp and cutter at one time and the other of which will impart movement to said clamp and cutter at a different time, and means functioning from pattern control on the machine for moving said swiveling extension for the purpose described.

16. A cutter for cutting float threads in a circular knitting machine including a fixed blade, a movable blade cooperating with said fixed blade and a plate and extension thereof attached to and moving with said movable blade for guiding floating threads into or beneath said cutter.

17. In a knitting machine the combination of a clamp and cutter and means for operating said clamp and cutter including a plurality of pattern elements each capable of imparting movements to the clamp and cutter at differently timed intervals, and means for periodically causing different ones of said pattern means to be rendered effective.

18. A cutter for cutting float threads in a circular knitting machine including a fixed blade, a movable blade cooperating with said fixed blade and movable vertically, a plate and extension thereof connected to and operable with said movable blade, the construction being such that when in one vertical position said plate and extension will guide floats into the cutter, but when in another vertical position, will prevent floats from entering said cutter.

ROBERT H. LAWSON.
ISAAC H. C. GREEN.